Aug. 25, 1964   A. A. BERLINSKY ETAL   3,145,920
FLOATING-POINT KEYPUNCH MACHINE
Filed June 19, 1962                    12 Sheets-Sheet 1
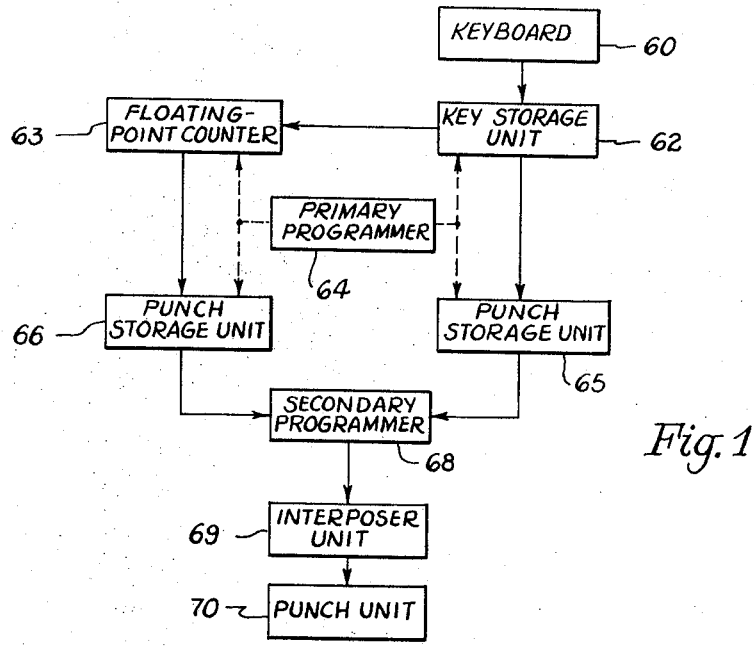
Fig. 1
| Fig. 8 |
| Fig. 9 |
| Fig. 10 |
| Fig. 11 |
| Fig. 12 |
| Fig. 13 |
| Fig. 14 |
| Fig. 15 |
| Fig. 16 |
| Fig. 17 |
Fig. 2
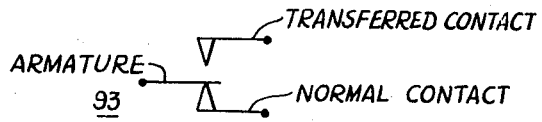
Fig. 3
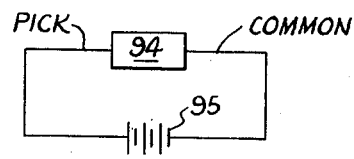
Fig. 4
INVENTORS
Anthony A. Berlinsky
Martin J. Brennan
Charles H. Stockton
BY David Robbins
ATTORNEY Aug. 25, 1964   A. A. BERLINSKY ETAL   3,145,920
FLOATING-POINT KEYPUNCH MACHINE
Filed June 19, 1962   12 Sheets-Sheet 2

PRIMARY PROGRAM CARD

SECONDARY PROGRAM CARD

INFORMATION CARD

INVENTORS
Anthony A. Berlinsky
Martin J. Brennan
Charles H. Stockton
BY David Robbins
ATTORNEY

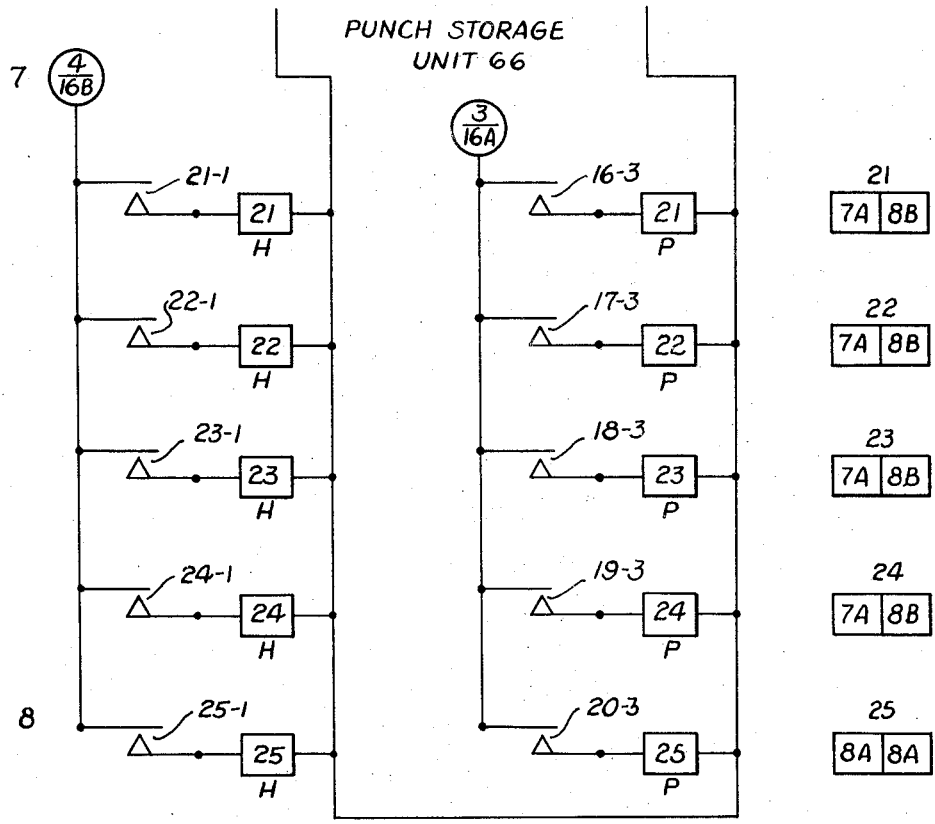
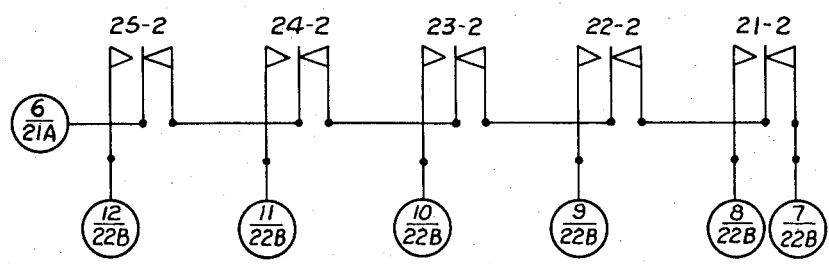
Fig. 11

INVENTORS
Anthony A. Berlinsky
Martin J Brennan
Charles H. Stockton
BY David Gobbins
ATTORNEY United States Patent Office 3,145,920
Patented Aug. 25, 1964

3,145,920
FLOATING-POINT KEYPUNCH MACHINE
Anthony A. Berlinsky, Silver Spring, Md., and Martin J. Brennan and Charles H. Stockton, Washington, D.C., assignors to the United States of America as represented by the Secretary of Commerce
Filed June 19, 1962, Ser. No. 203,664
10 Claims. (Cl. 234—55)

This invention relates to a keypunch machine that records a floating-point count in a card.

In the Hollerith code, the position of a perforation in a vertical column in a card indicates the value of a digit. The field or area on the card allotted to a category of information is determined by the number of digits necessary to record the information.

Very often, statistical information, taken from printed material, is recorded in the Hollerith code in several cards. When the nature of the statistics is such that the numbers can be rounded off, by using a floating-point punching technique, the cards may be provided with identical fields patterns. This results in a reduction of the number of columns and the time required in routing the cards through the machine. Another advantage obtains when the information on the card is recorded on magnetic tape and then fed into a computer. Since all the columns of the card are filled, the information on the tape is continuous without the blank portions normally found on the tape when the fields in the card vary in size. Since the fields in the card are uniform, all data related to one set of statistics is punched in sequence and thus comes out on the magnetic tape in a single, continuous array.

Because of these advantages and others apparent from the description below, the present invention provides a floating-point keypunch machine. The operator, using this machine and observing a number to be recorded in a card, sequentially strikes the keys on his keyboard corresponding to the digits of the number. The significant digits are stored in a key storage unit; the remaining digits are counted by a floating-point counter. When the add key is depressed, the significant digits and a count of the remaining digits are recorded in the card.

Accordingly, an object of the present invention is to provide a keypunch machine that permits the use of a method of reducing the number of digits required to express information in a card.

Another object is to provide a machine that automatically records in a card the significant digits and a count of the remaining digits of a number.

Another object of the present invention is to provide a machine with an automatic floating-point operation that is controlled by a program card so that the operator requires no additional instruction.

In the figures:

FIG. 1 is a block diagram of an embodiment of the present invention;

FIG. 2 is a block diagram showing the manner in which the circuit diagram in FIGS. 8 to 16 is assembled;

FIGS. 3 and 4 illustrate some of the terminology employed in this description;

FIGS. 8 to 17 comprise a circuit diagram incorporated in an embodiment of the present invention.

*Brief Description*

Figure 5:
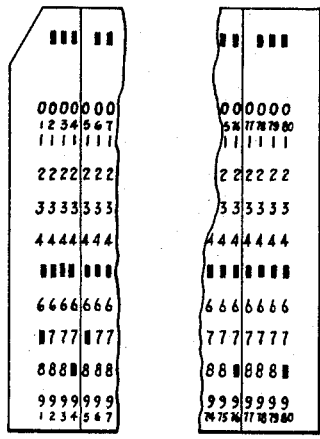
FIGS. 5 to 7 represent the primary program card, secondary program card, and information card, respectively, used herein.
Figure 6:
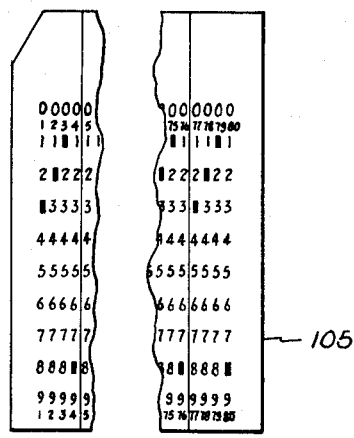

In using the embodiment in FIG. 1, the operator sequentially depresses the keys, in keyboard 60, corresponding to the digits of a number to be recorded. The significant digits are stored in key storage unit 62 and the remaining digits are counted by floating-point counter 63. When the add key is depressed, primary programmer 64 is activated; the significant digits are transferred to punch storage unit 65; and the count of the remaining digits is transferred to punch storage unit 66. The primary programmer then resets key storage unit 62 and floating-point counter 63. Secondary programmer 68 is activated and operates the magnets in interposer unit 69 in dependency upon the information stored in the punch storage units. The interposer magnets in turn control punch unit 70 to record the significant digits in respective columns and the count of the remaining digits in another column of a field of the card. The primary programmer 64 then resets punch storage units 65 and 66.

The following components in FIG. 1 are well-known in the art and are used in IBM keypunch machine 027: keyboard 60; key storage unit 62; primary and secondary programmers 64, 68; punch storage unit 65; interposer unit 69 and punch storage unit 70. These various units are modified, as described below, to cooperate with floating-point counter 63 and punch storage unit 66 to achieve the objects of the present invention.

*Terminology and Notations*

Before considering the remaining figures, the terminology and notations employed will be described. When FIGS. 8 to 17 are arranged as shown in FIG. 2, it will be noted that numbers ranging from 0 to 23 appear in the left-hand margin and letters A and B appear along the top of FIG. 8 of the composite drawing. This forms a coordinate system which may be conveniently used to locate the contacts of the relays in the figures. For example, relay coil 42P is associated with rectangle 42, FIG. 8, which represents relay 42 and is divided into sections marked 9A, 0B, 2A, 14B, representing contacts 42–1 to 42–4, or contacts 1 to 4 of the relay, respectively. The notation in each section designates the location of the associated contact in the figures. Thus, to use the notation 9A to locate contacts 42–1, find the area between numbers 9 and 10 in the left-hand margin of FIG. 12 and proceed to the A or left-hand portion of this figure.

Every relay and relay coil is represented by a number in a rectangle. When a rectangle has a P nearby, it represents a pick coil of a relay, the number of which appears in the rectangle. A pick coil is energized quickly and is used for operations that are not to be maintained for a long period of time. When a rectangle has an H nearby, it represents a coil used in a hold circuit for the relay whose number appears in the rectangle. Finally, when a rectangle is denominated by a number and LP or a number and LT, it represents the coil of a latch-trip relay. If the former is energized, it latches an armature closing the relay contacts; if the latter is energized, it releases that armature, opening the relay contacts.

Figure 13:
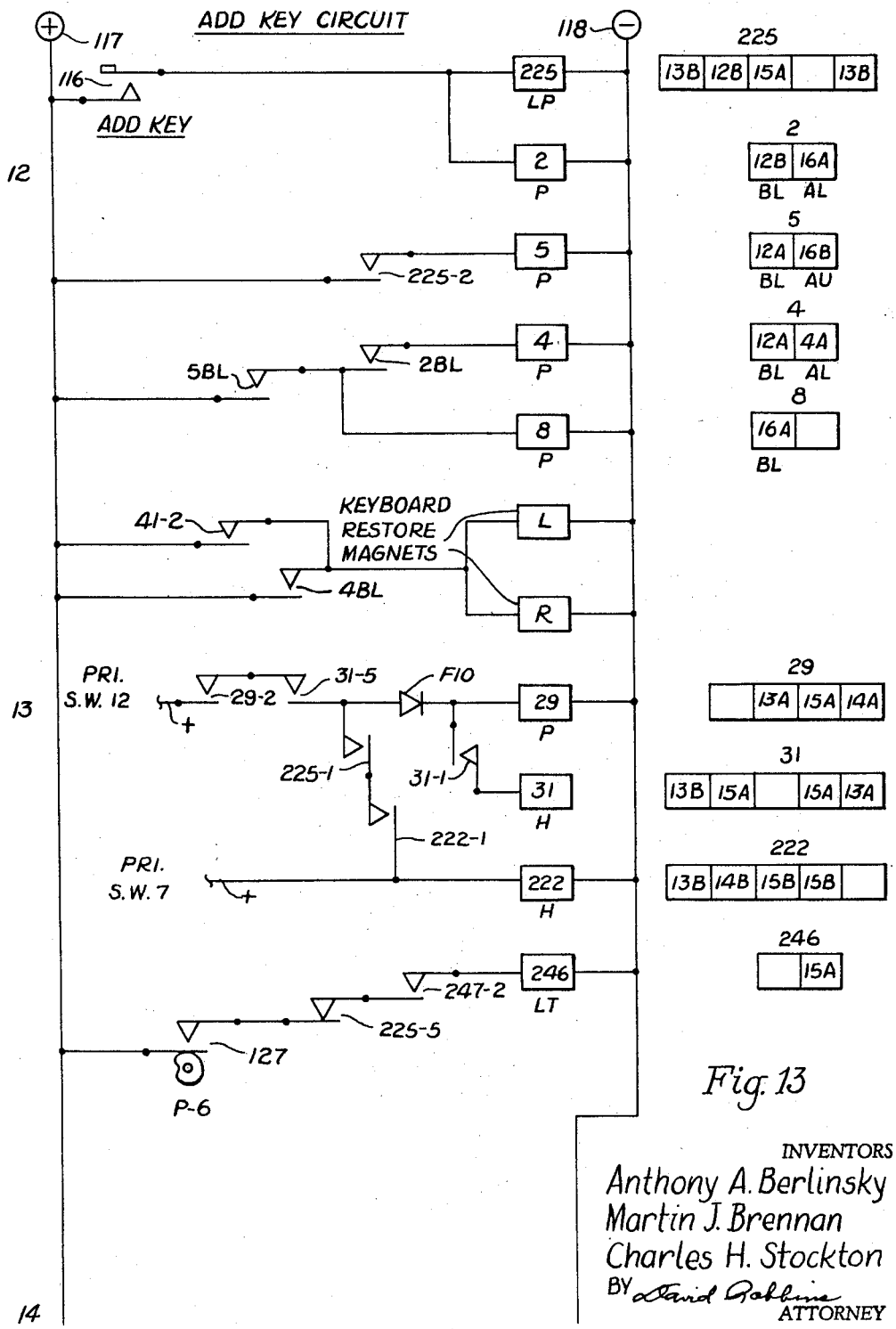

When a rectangle is divided into sections and either AL, AU, or BL is found below a section, the letters and the relay number, appearing above the rectangle, designate the contacts located at the coordinate position indicated in the associated section. Thus, contacts 2AL of relay 2 in FIG. 13 are located at 16A.

Some of the terminals in the drawings are represented by the number of the terminal over a coordinate, for example, $$\frac{1}{6B}$$

at 3A. This indicates that the terminal is connected to one marked $$\frac{1}{3A}$$

which may be found at 6B.

When a lead is broken and a number is found nearby, that number corresponds to a component found in the IBM machine.

Referring to FIG. 3, the armature of contacts 93 is resting on the "normal" contact and, when actuated, engages or is transferred to the "transferred" contact. When the armature engages the transferred contact, the contacts are designated as "transferred contacts 93."

Referring to FIG. 4, the positive terminal of battery 95 is connected to the "pick" side of relay 94, while the negative terminal is connected to the "common" side of the relay.

Primary Programmer

Primary programmer 64 is normally used in the IBM machine 027 to program certain operations such as auto-skip, auto-dup, high-speed skip, punch storage read-out start, and punch storage read-out end. In this embodiment, the primary programmer has been modified so that a floating-point operation can also be programmed.

Primary program card 71 in FIG. 5 is punched in accordance with the operations of the IBM machine to be programmed. Thus, row 12 is punched to establish field definition, row 5 to control the floating-point operation, row 7 to control the storage read-out start, and row 8 is punched to control the storage read-out end. Each row is sensed by an associated primary star wheel, thereby effecting the desired operations as will be described in detail below.

Figure 7:
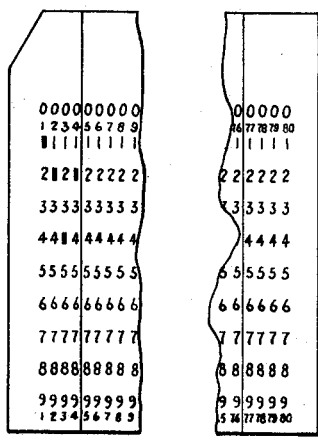

In this embodiment, each of the first three digits of the number punched by the operator is recorded in a respective one of the first three columns of a field in information card 72 in FIG. 7, and a fourth digit is recorded in the fourth column in each field to indicate the number of digits that have been dropped. To accomplish this, primary program card 71 is punched as indicated in FIG. 5. It is noted that in the first four-column field, a perforation is recorded in each of the following positions: row 12, columns 2 to 4; row 5, columns 1 to 4; row 7, column 1; and row 8, column 4.

Keyboard and Key Storage Unit

Figure 8:
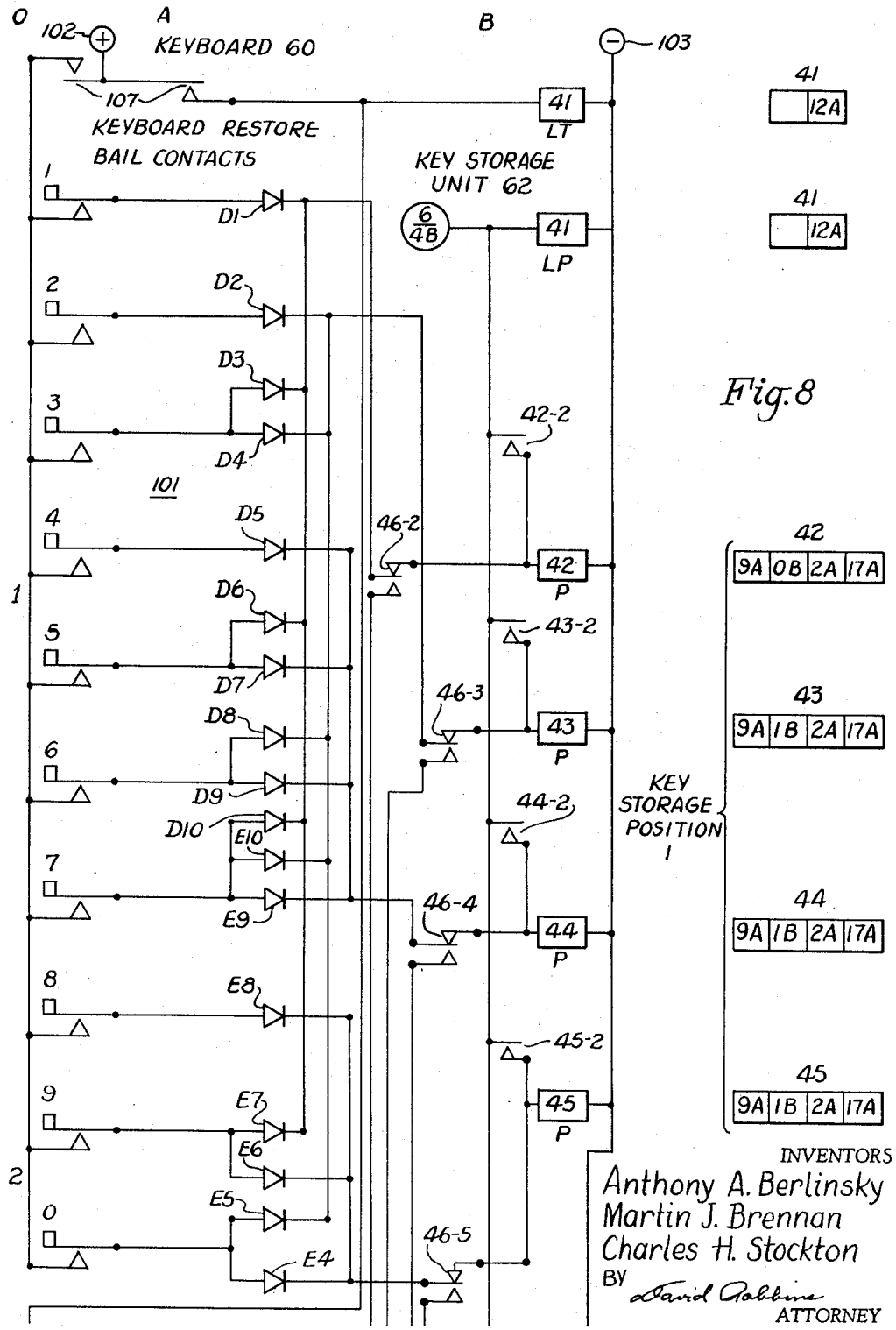
Figure 9:
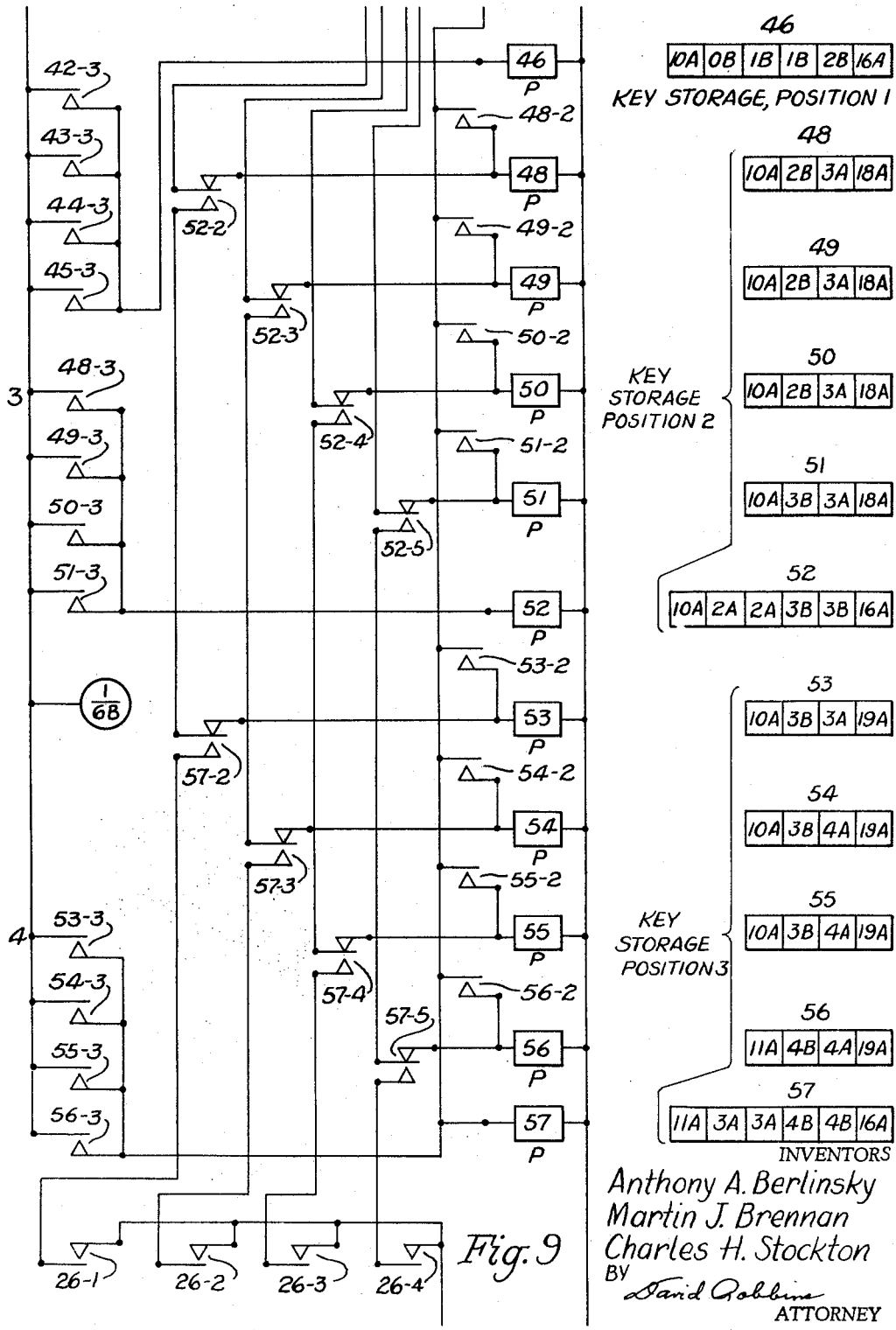

Referring to FIG. 8, keyboard 60 includes key 0 and 1 to 9, each corresponding to a digit to be recorded in information card 72.

Key storage unit 62 in this embodiment includes three positions. Key storage position 1 comprises: relay coils 42P to 46P and 42H to 46H in FIGS. 8, 9 and 12; key storage position 2: coils 48P to 52P, 48H to 52H in FIGS. 9 and 12; and key storage position 3: coils 53P to 57P and 53H to 57H. Coils 46P, 46H, 52P, 52H, and 57P, 57H are referred to as "column shift relay coils."

The contacts of the relays in positions 1 to 3 are connected in such a manner that selected contacts, when transferred, are connected in series, each contact being associated with a respective relay in a particular position. Thus, contacts 46-2, 52-2 and 57-2, when transferred, are connected in series.

Each relay in key storage positions 1 to 3 is capable of being connected, by keyboard 60 and matrix 101, across terminals 102, 103. Thus, the storage positions are connected in parallel. Further, storage position 1 is normally activated and positions 2 and 3 are normally inactivated. When column shift relay coil 46P in position 1 is picked up, key storage position 2 is activated. When column shift relay coil 52P in position 2 is picked up, key storage position 3 is activated; and when relay 26 and column shift relay coil 57P in position 3 are picked up, signals may be applied through the key storage unit 62 to the floating-point counter 63, as will be described below.

Diode matrix 101 in FIG. 8 comprises diodes D1 to D10 and E4 to E10. Each input of the diode matrix is connected to a respective one of the keys in keyboard 60, while each output of the matrix is connected to a respective armature in contacts 46-2 to 46-5. Each normal contact in contacts 46-2 to 46-5 is tied to the pick side of a respective one of relay coils 42P to 45P. When any one of these coils is energized, a circuit is completed through one of contacts 42-3 to 45-3, energizing column shift relay coil 46P. Contacts 46-2 to 46-5 are then transferred.

Each transferred contact of 46-2 to 46-5 is connected to a respective armature of contacts 52-2 to 52-5 and each normal contact of the latter is connected to the pick side of a respective one of relay coils 48P to 51P. When any one of coils 48P to 51P is activated, a circuit is completed through one of the contacts 48-3 to 51-3 to pick up column shift relay coil 52P. Contacts 52-2 to 52-5 are then transferred.

Each transferred contact of contacts 52-2 to 52-5 is connected to a respective armature of contacts 57-2 to 57-5. Each normal contact of these contacts is connected to the pick side of a respective one of relay coils 53P to 56P. When any one of the last-mentioned coils is picked up, a circuit is completed through one of the contacts 53-3 to 56-3 to energize column shift relay coil 57P. Contacts 57-2 to 57-5 are then transferred.

The common side of each of relay coils 42P to 46P and 48P to 57P is connected to negative terminal 103.

When one of the relays 42P to 45P, 48P to 51P, or 53P to 56P is energized, one of the contacts 42-2 to 45-2, 48-2 to 51-2, or 53-2 to 56-2 is closed to complete a circuit that energizes relay coil 41LP.

Figure 10:
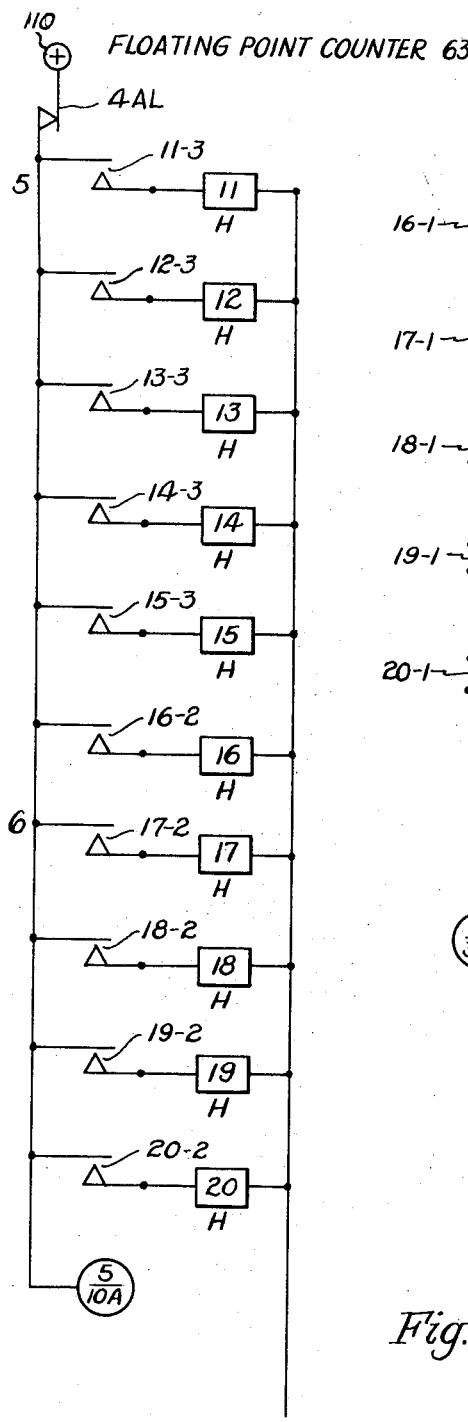
Figure 12:
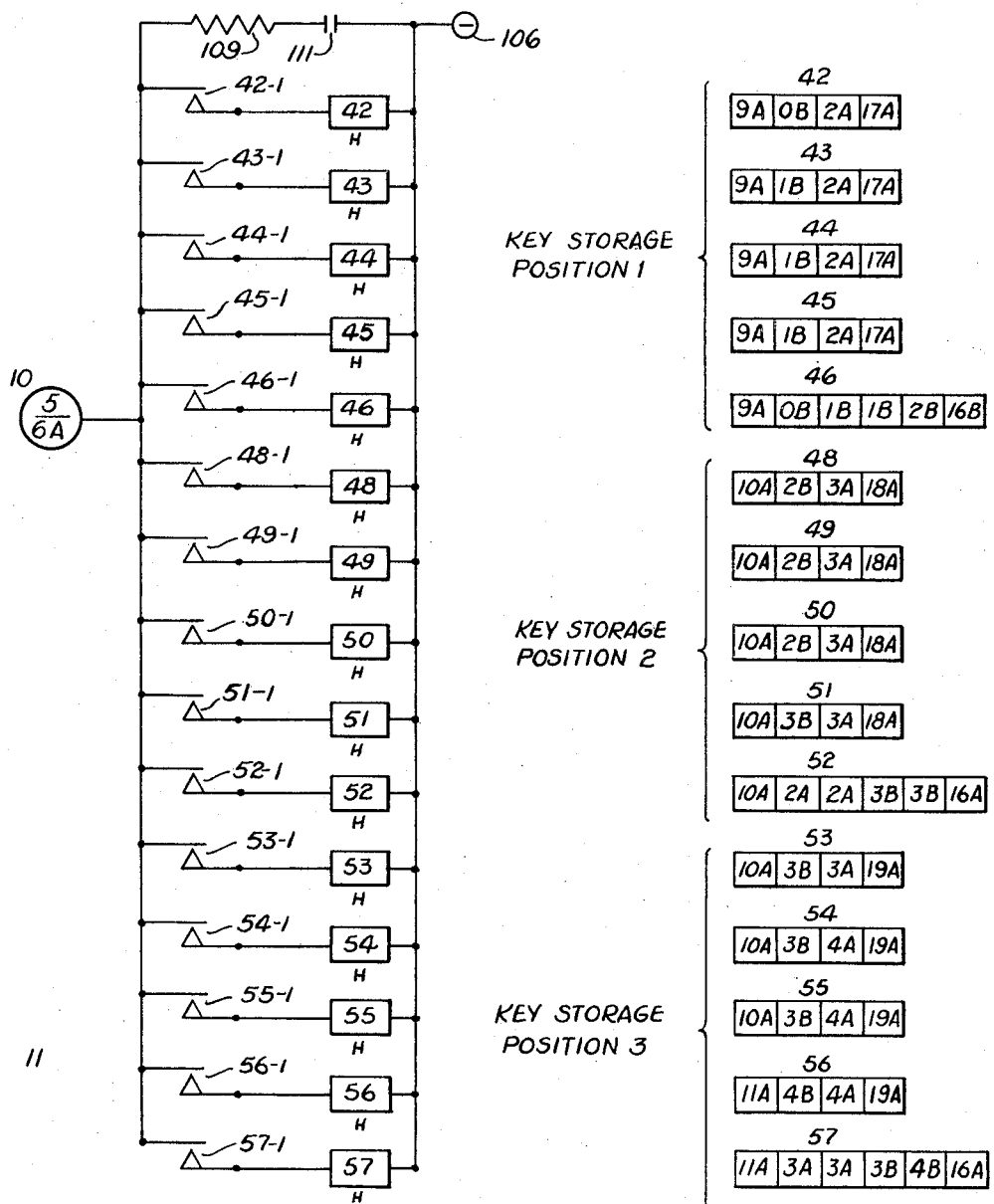

Referring to FIG. 12, the common side of each relay coil 42H to 46H and 48H to 57H is tied to negative terminal 106. The pick side of each of these coils is connected to the fixed contact of a respective one of contacts 42-1 to 46-1 and 48-1 to 57-1. The armatures of these contacts are tied together and through terminals $$\frac{5}{6A} \quad \frac{5}{10A}$$

and normally closed contacts 4AL to positive terminal 110 in FIG. 10. Thus, when one of the relay coils in the last-mentioned group is energized, one contact in the latter group of contacts is closed to establish a holding circuit for the relay associated with the energized coil.

Resistor 109 and capacitor 111, connected between terminals $$\frac{5}{6A}$$

and 106, form an arc suppressor circuit for contacts 42-1 to 46-1 and 48-1 to 57-1.

Start of a Typical Operation

In an example of operation, which is started here and continued below, assume that the operator observes the number 12,454. The digits 1, 2, 4 are to be recorded in the first three columns of a four-column field on information cards 72 in FIG. 7 and the numeral 2 in the last column indicating that two digits have been dropped.

When key 1 is depressed, the key is latched and a circuit is completed from positive terminal 102 through diode D1, contacts 46-2, relay coil 42P to negative terminal 103, thereby energizing coil 42P. Contacts 42-1 close, completing a circuit from negative terminal 106 in FIG. 12 through relay coil 42H and terminals $$\frac{5}{6A} \quad \frac{5}{10A}$$

to positive terminal 110 in FIG. 10, energizing the latter coil. Contacts 42-2 close, energizing relay coil 51LP. Contacts 41-2 then transfer to activate keyboard restore magnets L and R in FIG. 13 which release the latch of key 1. As the key is reset, keyboard restore bail contacts 107 in FIG. 8 are closed momentarily to operate relay coil 41LT. Relay 41 is then released.

When bail contacts 107 close momentarily, a circuit is completed through contacts 42-3 that energizes relay coil 46P. Contacts 46-1 are then transferred, completing a circuit that picks up relay coil 46H, establishing a holding circuit for relay 46. Contacts 46–2 to 46–5 are also transferred so that digit 1 is now stored in key storage unit 62, position 1.

When key 2 is depressed, a circuit is completed through diode D2, contacts 46–3, which were transferred, and contacts 52–3 to energize relay coil 49P. Contacts 49–1 are then closed, energizing relay coil 49H; and contacts 49–2 close, completing circuits that operate relay coil 41LP and keyboard restore magnets L and R, as indicated immediately above, effecting operations that release key 2. As the key is reset, keyboard restore bail contacts 107 close momentarily, and a pulse is applied through contacts 49–3 to energize relay coil 52P. Contacts 52–1 close, establishing a holding circuit for relay 52 that includes relay coil 52H. Contacts 52–2 to 52–5 are transferred. Digit 2 is now stored in the key storage unit 62, position 2.

When key 4 is depressed, a circuit is completed through diode D5, contacts 46–4, 52–4, which were transferred, and 57–4 to energize relay coil 55P. Contacts 55–1 close to established a holding circuit which picks up relay coil 55H. Contacts 55–2 close, completing circuits that operate keyboard restore magnets L and R, which release key 4 as indicated above. When keyboard restore bail contacts 107 again close momentarily, a circuit is set up through contacts 55–3 to energize the relay coil 57P. Contacts 57–1 transfer to energize relay coil 57H, establishing a holding circuit for relay 57, and contacts 57–2 to 57–5 are transferred. Digit 4 is now stored in the key storage unit 62, position 3.

*Floating-Point Counter*

Referring to FIG. 10, primary star wheel 5 is connected through relay coil 26H to negative terminal 103. When primary star wheel 5 senses the perforations in row 5 of the primary program card 71 in FIG. 5, as described below, relay coil 26H is energized, transferring the armature of contacts 26–1 to 26–4. Resistor 108 and capacitor 112 form an arc suppressor circuit positioned across this relay coil. The fixed contacts of contacts 26–1 to 26–4 are tied together and to the armature of contacts 16–1, while each armature of contacts 26–1 to 26–4 is connected, in turn, to a respective one of the transferred contacts of 57–2 to 57–5.

Contact sets 16–1 to 20–1 are connected in series in such a manner that the transferred contacts of each preceding contact set, except 20–1, is connected to the armature of the succeeding contact set. Each pick side of relay coils 11P to 15P is connected to a respective one of the normal contacts of 16–1 to 20–1.

Each armature of contacts 11–2 to 15–2 is connected to terminal $$\frac{6}{0B}$$

and each fixed contact is connected to the pick side of a respective one of relay coils 11P to 15P. The common side of each of these coils is connected to negative terminal 103 in FIG. 8. Similarily, positive terminal 110 is connected through contacts 4AL to the armatures of each of the contacts 11–3 to 15–3, and 16–2 to 20–2. The fixed contact of each of these contacts is connected to the pick side of a respective one of the relay coils 11H to 20H, and the common side of each of these coils is connected to negative terminal 103. Again, terminal $$\frac{1}{3A}$$

is connected to each armature of contacts 11–1 to 15–1, and the fixed contacts of each of these contacts is connected to the pick side of a respective one of relay coils 16P to 20P. The common side of each of these coils is connected to negative terminal 103, while terminal $$\frac{1}{3A}$$

is connected through terminal $$\frac{1}{6B}$$

and contacts 107 to positive terminal 104 in FIG. 8.

Continuing the example started above, when key 5 is struck, positive potential is applied through diode D6, contacts 46–2, 52–2, and 57–2, contacts 26–1, which were transferred, to the armature of contacts 16–1. Positive potential is also applied through diode D7 and contacts 46–4, 52–4, 57–4, which were also transferred, and 26–3 to the armature of contacts 16–1. This energizes relay coil 11P, closing its associated contacts. When contacts 11–2 close, a circuit is completed through terminals $$\frac{6}{0B} \quad \frac{6}{4B}$$

that energizes relay coil 41LP, whose associated contacts in turn activate keyboard restore magnets L and R in FIG. 13 to release key 5 in the manner described above. When contacts 11–3 close, relay coil 11H is energized, established a holding circuit for relay 11. Finally, when contacts 11–1 close and bail contacts 107 close momentarily, relay coil 16P is energized, transferring its contacts. Contacts 16–1 close, conditioning relay coil 12P for activation. Contacts 16–2 close to energize relay coil 16H, activating a holding circuit for relay 16. Contacts 16–3 close so that, as will be described later, a potential will subsequently be applied through these contacts to energize relay coil 21P in punch storage unit 66.

When key 4 is depressed, positive potential is applied through diode D5, contacts 46–4, 52–4, 57–4, 26–3 and 16–1, all of which were transferred, contacts 17–1 and relay coil 12P, activating the coil. Contacts 12–2 close to energize relay coil 41LP which in turn energizes keyboard restore magnets L and R. Key 4 is then released, as described above. Contacts 12–3 close to pick up relay coil 12H, thereby activating a holding circuit for relay 12. Contacts 12–1 close to activate relay 17P which closes contacts 17–2, thereby energizing relay coil 17H. Thus, a holding circuit is set up for relay 17. Contacts 17–3 transfer so that, as indicated below, a potential will subsequently be applied through these contacts to energize relay coil 22P in punch storage unit 66. A count of 2 is now stored in this punch storage unit.

*Add Key Circuit*

When add key 116 in FIG. 13 is struck, information is transformed from the floating-point counter 63 to punch storage unit 66 and from key storage unit 62 to punch storage unit 65. (See "Punch Storage Units," infra.) Circuits are also completed that advance primary program card 71, information card 72 and secondary program card 105. (The latter is located in secondary programmer 68.) The primary and secondary program cards move in unison and one column ahead of the information card. The secondary program card 105 completes circuits that control the magnets in interposer unit 69 in dependency upon the information stored in punch storage unit 65, 66. (See "Punch Storage Read-Out," infra.)

While the number to be recorded is being keyed, primary program card 71 in FIG. 5 is positioned on the first column, first field; and information card 72 is positioned one column before this field. Primary star wheel 7 in FIG. 13 then senses the perforation in row 7 of the first column in the primary program card, and positive potential is applied from this star wheel through relay coil 222H to negative terminal 118. The latter coil is energized, transferring contacts 222–1.

When add key 116 is depressed, it is mechanically latched and completes a circuit from positive terminal 117 through relay coil 2P to negative terminal 118 and through relay coil 225LP to the negative terminal. Relay coils 2P and 225LP are picked up. Contacts 2BL transfer. Contacts 225–2 also transfer, activating relay coil 5P. Contacts 5BL then close to complete a circuit that energizes relay coils 4P and 8P. When relay coil 4P is energized, contacts 4BL close to operate keyboard restore magnets L and R, which unlatches the add key 116 in the manner described above in the section entitled "Keyboard and Key Storage Unit."

When the add key is released, the circuit through relay coils 2P and 225LP is broken. Relay coil 2P is released, but since relay coil 225LP is part of a latch-trip relay, the contacts of this relay remain closed, and positive potential is applied from primary star wheel 7 through transferred contacts 222–1 and 225–1, diode F10 and relay coil 29P. The latter coil is then energized.

A dummy punch-clutch cycle is now effected to advance information card 72 to its first column and primary card 71 to its second column. When add key 116 is depressed, as described immediately above, relay coils 225LP and 29P are energized to close contacts 225–3 and 29–3. This completes a circuit through normally closed contacts 31–2 to energize punch-clutch magnet 115 in FIG. 14 which releases a spring-type clutch, not shown, permitting the punch shaft in IBM machine 027 to rotate. Cams P3 and P5 are located on the punch shaft in the IBM machine. As the shaft rotates, cam P3 closes contacts 120 from 7° to 87° of the shaft's rotation. When the latter contacts close, a circuit is completed through transferred contacts 29–4 to energize relay coil 31P. Contacts 31–1 and 31–5 then close to complete a circuit from primary star wheel 12 through transferred contacts 29–2 and diode F10 to energize relay coil 31H, which establishes a holding circuit for relay 31. A holding circuit for relay 222 is also established through contacts 29–2, 31–5, 225–1, 222–1 and relay coil 222H. Contacts 31–2 open to de-energize punch-clutch magnet 115 and to prevent another punch-clutch cycle from being effected through the circuit that includes these contacts.

Figure 14:
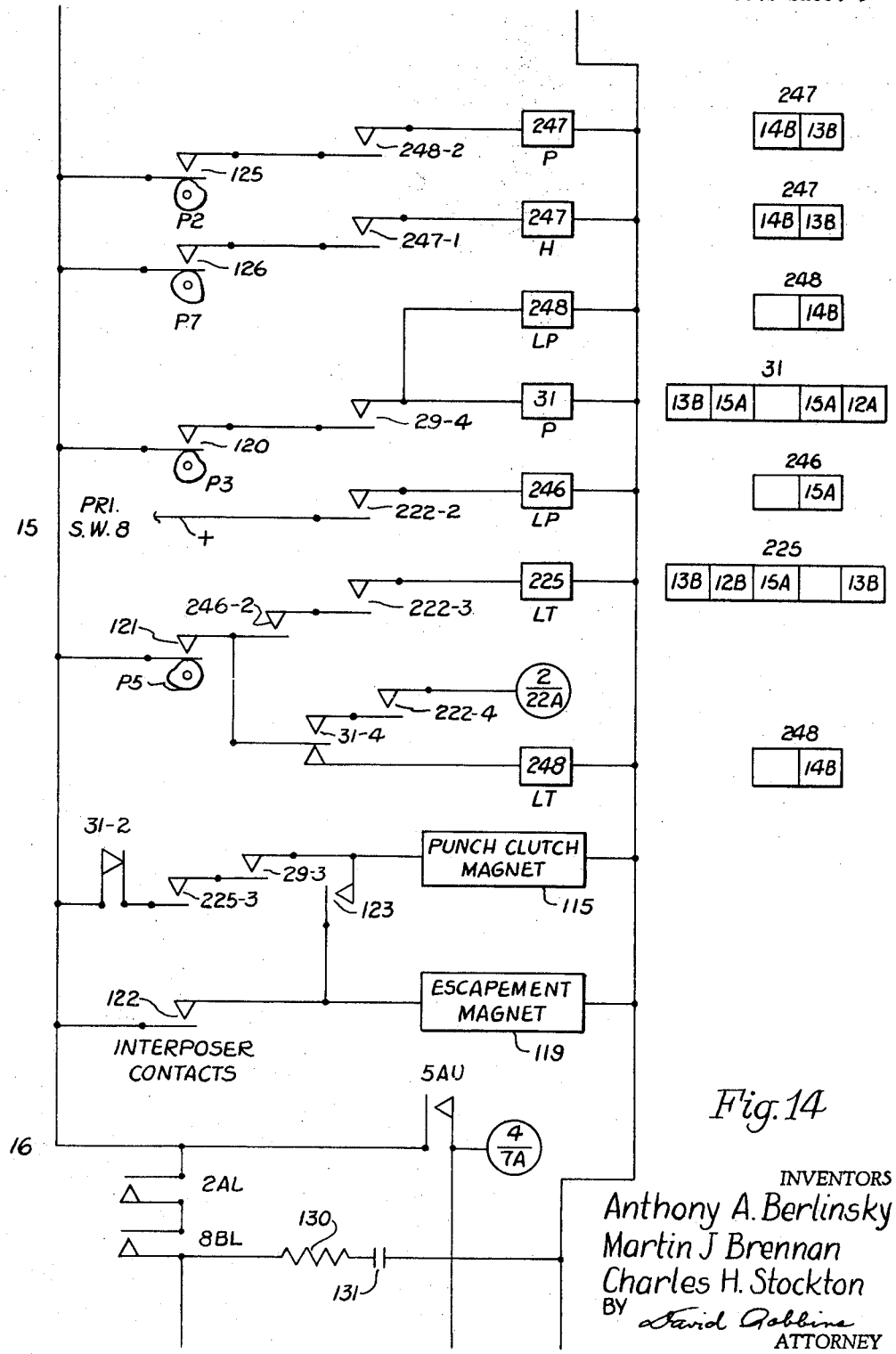

When one of the magnets in interposer unit 69 is energized (see "Punch-Storage Read-Out," infra.), interposer bail contacts 122 close to energize escapement magnet 119 in FIG. 14, which in turn closes escapement arm contacts 123. This completes a circuit which activates punch-clutch magnet 115, effecting another punch-clutch cycle. This sequence of events is repeated each time that one of secondary star wheels 1 to 3 and 8 in FIG. 17 sense a perforation in secondary program card 105.

When cam P3 in FIG. 14 closes contacts 120 from 7° to 87° of the punch shaft's rotation and contacts 29–4 are transferred, as described immediately above, relay coil 248LP is energized. Contacts 248–2 transfer, and relay 248 is latched. Cam P2 closes contacts 125 from 345° to 85° and 160° to 345° of the rotation of the punch shaft. (The shaft is at rest at 345°.) When contacts 125 close, since contacts 248–2 are transferred, relay 247P is activated, transferring contacts 247–1, 247–2. Cam P7 closes contacts 126 from 70° to 340° of the shaft's rotation, establishing a holding circuit, through contacts 247–1, for relay 247. Note that there is an overlap in the degrees of rotation during which contacts 125 and 126 remain closed. Cam P6 closes contacts 127 from 130° to 260° of the shaft's rotation, completing a circiut through normally closed contacts 225–5 and transferred contacts 247–2, to energize relay coil 246LT. Relay 246 is then released. Cam P5 closes contacts 121 from 86° to 166° of the shaft's rotation to complete a circuit through normally closed contacts 31–4 to energize relay coil 248LT. Relay 248 is then released.

From the time relationships presented immediately above, it is apparent that relays 246 and 247 remain energized as long as the hold circuits for relays 29 and 31 are activated and that relay 246 remains latched as long as relay 222 is energized. During the punch-clutch cycle, described just below, when relays 29, 31 and 222 are released, relays 246 to 248 drop out.

During the punch-clutch cycle when primary star wheel 8 in FIG. 14 senses the perforation in row 8, column 4, program card 71, a circuit is completed through contacts 222–2, which were transferred, to energize relay coil 246LP. Contacts 246–2 transfer, and since contacts 222–3 are transferred, when cam P5 closes contacts 121, a circuit is completed that activates relay coil 225LT to release relay 225.

During the following punch-clutch cycle when primary star wheel 12 in FIG. 13 senses the unperforated row 12, column 5, primary card 71, the holding circuits for relays 29, 31 and 222 are broken and the relays are released. The IBM machine is now in its rest position.

*The Punch Storage Units*

When add key 166 on keyboard 60 is depressed, the information in key storage unit 62 is transferred to punch storage unit 65, and the information in the floating-point counter 63 is transferred to punch storage unit 66. Before this operation is described, a brief description of each punch storage unit will be presented.

Referring to punch storage unit 66 in FIG. 11, terminal $$\frac{4}{16B}$$

is connected to each armature of contacts 21–1 to 25–1. Each fixed one of these contacts is connected to a respective pick side of relay coils 21H to 25H. Likewise, terminal $$\frac{3}{14A}$$

is connected to each armature of contacts 16–3 to 20–3, and each fixed contact is connected to a respective pick side of relay coils 21P to 25P. The common side of each coil 21H to 25H and 21P to 25P is connected to negative terminal 103 in FIG. 8. Contacts 21–2 to 25–2 each have a transferred contact which is connected to a respective one of the magnets in interposer unit 69, shown in FIG. 17.

Figure 15:
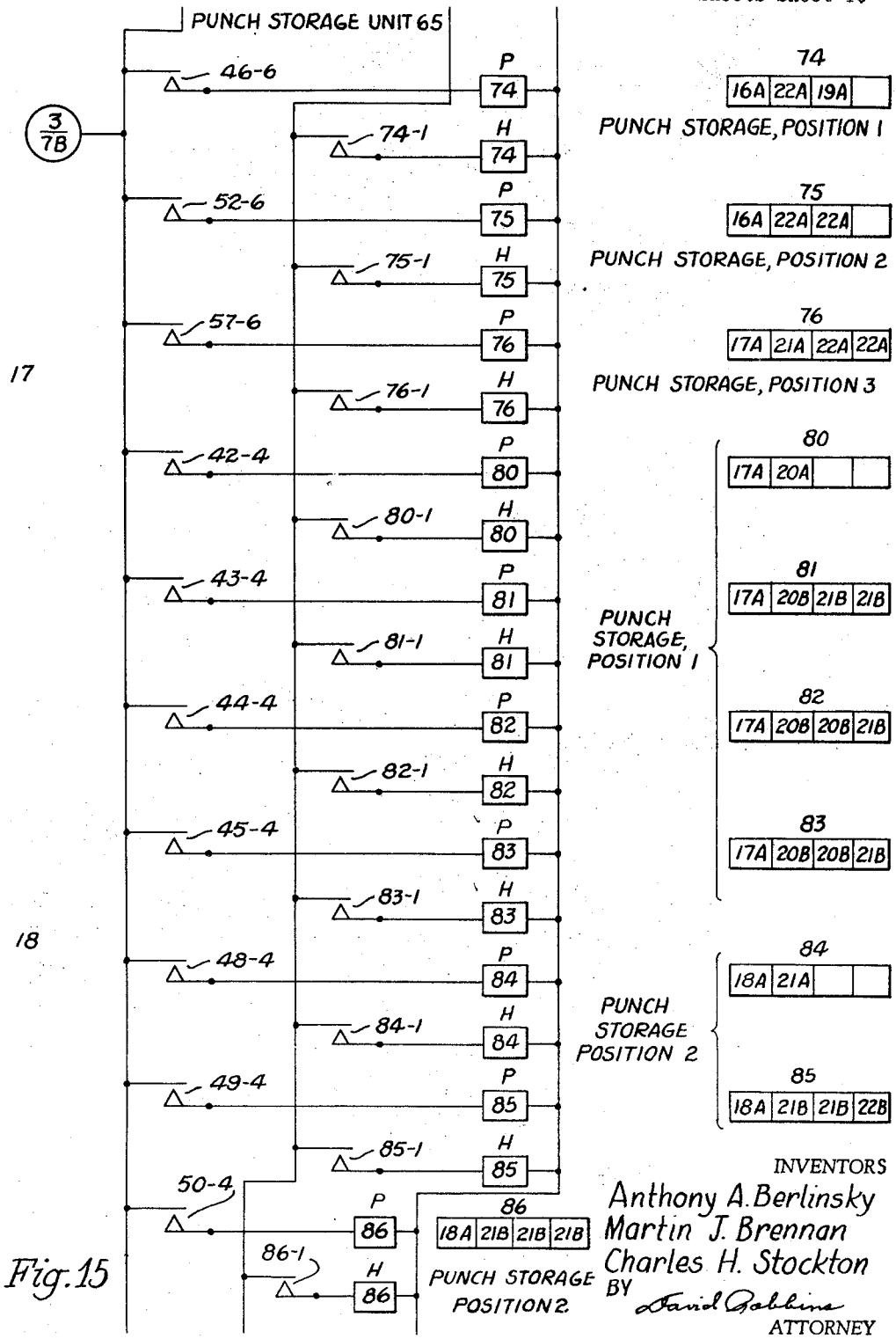
Figure 16:
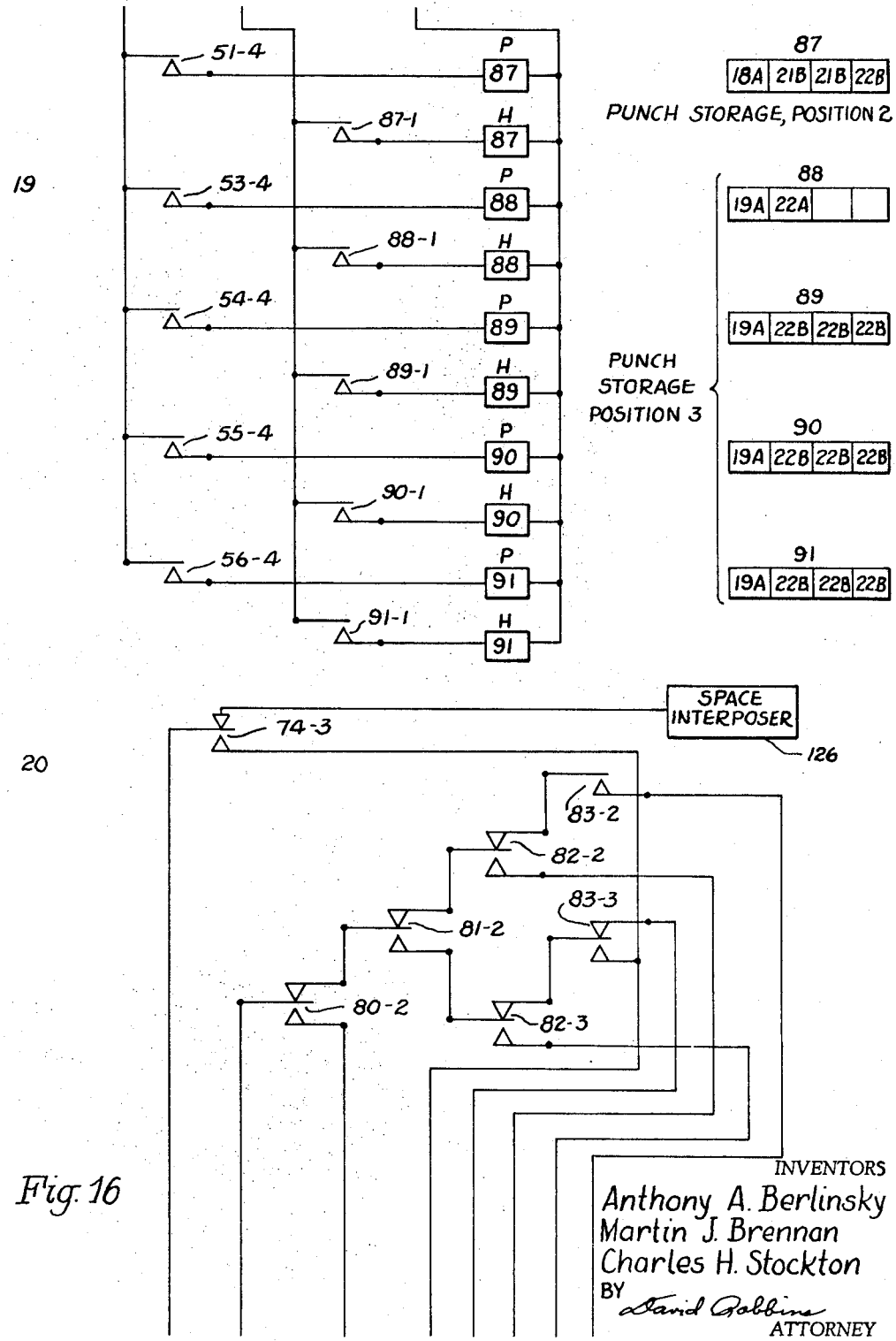

Referring to FIGS. 15 and 16, punch storage unit 65 includes relay coils 74P, 80P to 83P, 74H and 80H to 83H, which are associated with position 1 of this unit; relay coils 75P, 84P to 87P, 75H, and 84H to 87H, associated with position 2; and relay coils 76P, 88P to 91P, 76H and 88H to 91H, associated with position 3. Resistor 130 and capacitor 131 in FIG. 14 form an arc suppressor circuit for the contacts associated with the relay coils enumerated in this paragraph.

Continuing the example started above, when key 1 in keyboard 60 is struck, relay coils 42H and 46H in key storage unit 62 are energized, transferring contacts 42–4 46–6 in position 1, punch storage unit 65. Similarly, when key 2 is struck, relay coils 49H, 52H are picked up, and contacts 49–4, 52–6 in position 2 of the punch storage unit 65 are closed; and when key 4 is struck, relay coils 55H, 57H are picked up and contacts 55–4, 57–6 in position 3 of this storage unit are closed. When add key 116 is depressed, and relay coils 2P, 5P and 8P are activated to transfer contacts 2AL, 5AU and 8BL, as described above under "Add Key Circuit," positive potential is applied through the contacts just enumerated to energize relay coils 74P, 75P, 76P, 80P, 85P and 90P, transferring contacts 74–1, 75–1, 76–1, 80–1, 85–1, and 90–1. Since contacts 5AU are closed, holding circuits are established for their associated relays through each of the relay coils 74H to 76H, 80H, 85H and 90H. These circuits will remain in operation until secondary programmer 68 effects the transfer of the information in punch storage unit 65 to the magnets in interposer unit 69, as will be described in detail below.

When key 5 is depressed, relay coil 16P is energized, transferring contacts 16–3 in punch storage unit 66 in FIG. 11; and when key 4 is depressed, relay coil 17P is activated, closing contacts 17–3. (See "Floating-Point Counter," supra.)

Again, when add key 116 is depressed, relay coils 2P, 5P, and 8P are energized. Contacts 2AL and 8BL then close to complete a circuit from positive terminal 117 in FIG. 13 through terminals $$\frac{3}{7B}$$

and $$\frac{3}{16A}$$

and contacts 16–3, energizing relay coil 21P, and through contacts 17–3, energizing relay coil 22P. Contacts 21–2 and 22–2 then transfer. At approximately the same time, a circuit is completed through contacts 5AU, terminals $$\frac{4}{7A} \quad \frac{4}{16B}$$

and through contacts 21–1 to energize relay coil 21H and through contacts 22–1 to energize relay coil 22H. Activation of coils 21H and 22H set up holding circuits for relays 21 and 22 which are effective during punch storage read-out, described immediately below.

When add key 116 is depressed, relay coil 4P is energized. Contacts 4AL open to reset key storage unit 62 and floating-point counter 63.

*Punch Storage Read-Out*

Continuing the example started above, it will be recalled that relay coils 74H to 76H, 80H, 85H, and 90H were activated in punch storage unit 65 to store the digits 1, 2 and 4 therein, that relay coils 21H, and 22H were activated in punch storage unit 66 to store a count of 2 therein, and that when add key 116 is struck, cards 71, 72 and 105 are advanced in unison.

Figure 17:
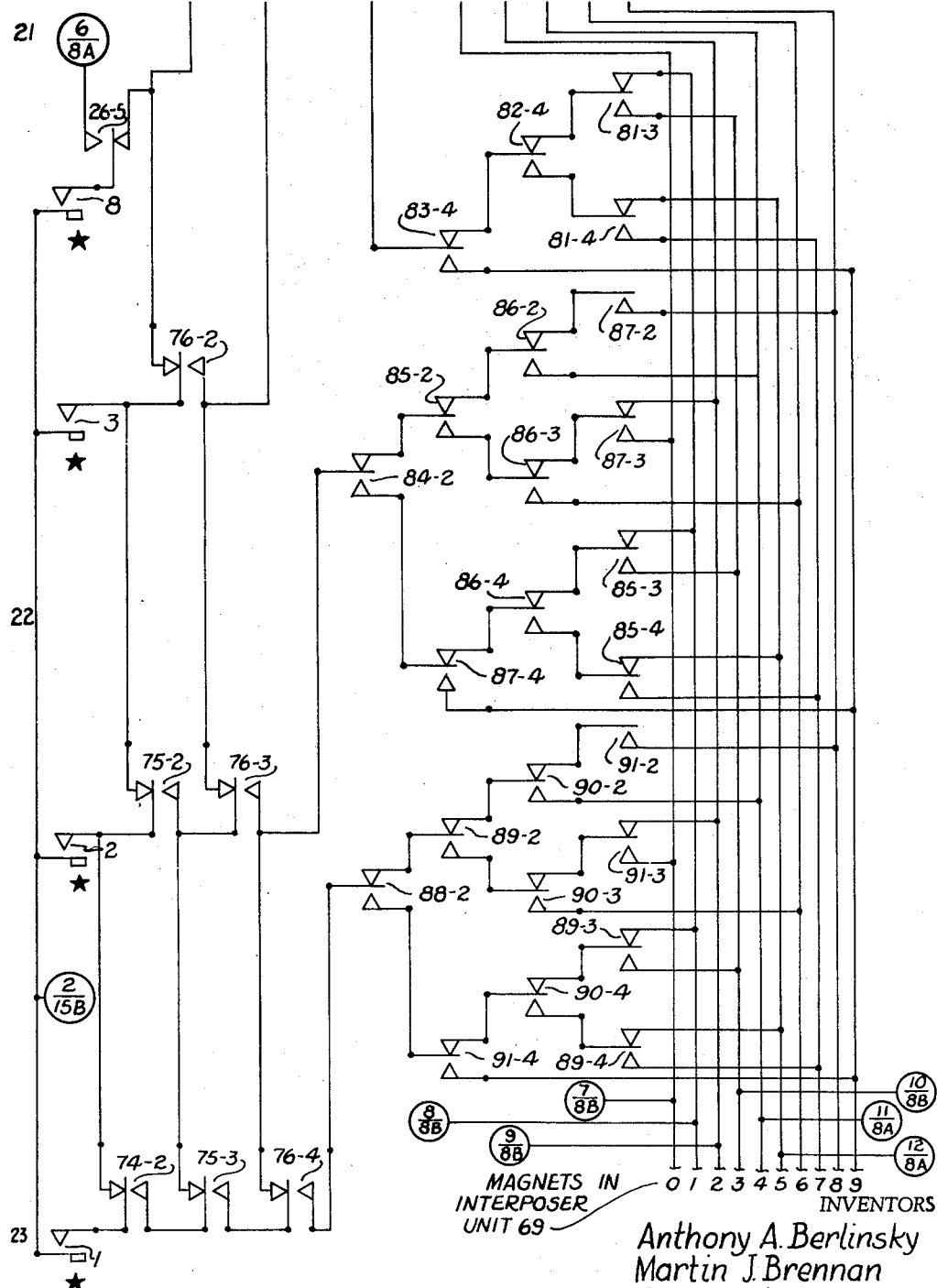

When star wheel 3 in FIG. 17 senses the perforation in row 3, column 1 of secondary program card 105, the contacts of the star wheel close. From 86° to 166° of the rotation of cam P5 in FIG. 14, the cam closes contacts 121. Positive potential is then applied through transferred contacts 31–4, 222–4, terminals $$\frac{2}{22A}$$

and $$\frac{2}{15B}$$

the contacts of secondary star wheel 3, transferred contacts 76–2, 80–2, contacts 83–4, 82–4, and 81–3 to magnet 1 in interposer unit 69. The magnet is energized and interposer bail contacts 122 in FIG. 14 are transferred, completing a circuit through escapement magnet 119. The escapement magnet is then activated to advance cards 71, 72 and 105 in unison one column. At the same time, escapement arm contacts 123 close to complete a circuit that energizes punch-clutch magnet 115 located in punch unit 70, FIG. 1. This effects the perforation of information card 72 in row 1, column 1.

Since secondary program card 105 is perforated in row 2, column 2, when the card is advanced one column and cam P5 again closes contacts 121, positive potential is applied through the contacts of secondary star wheel 2, transferred contacts 75–2, 76–3, contact 84–2, transferred contact 85–2 and contacts 86–3, 87–3 to magnet 2 in interposer unit 69. The magnet is energized; row 2, column 2 of information card 72 is perforated, and cards 71, 72 and 105 are advanced in the manner indicated immediately above.

When secondary program card 105 is advanced, since column 3 is perforated in row 1, the contacts associated with secondary star wheel 1 are closed. When cam P5 closes contacts 121, positive potential is applied through transferred contacts 74–2, 75–3, 76–4, contacts 82–2, 89–2, transferred contact 90–2 to magnet 4 in interposer unit 69. Magnet 4 is energized, row 4, column 3 of information card 72 is perforated, and cards 71, 72, and 105 are advanced.

It will be recalled that relay coil 26H was energized when primary star wheel 5 in FIG. 10 sensed the perforations in row 5, columns 1 to 4 of primary program card 71, and that relay coils 21H, 22H in punch storage unit 66 in FIG. 11 were later energized to indicate that two digits were dropped. Thus, contacts 21–2, 22–2, and 26–5 are transferred. When cam P5 again closes contacts 121 and secondary star wheel 8 senses the perforation in row 8, column 4 of secondary program card 105, positive potential is applied through terminals $$\frac{2}{22B} \quad \frac{2}{15B}$$

transferred contacts 26–5, terminals $$\frac{6}{8A} \quad \frac{6}{21A}$$

contacts 25–2, 24–2, 23–2, transferred contacts 22–2, and terminals $$\frac{9}{22B} \quad \frac{9}{8B}$$

to magnet 2 of the interposer unit 69. A perforation is then recorded in row 2, column 4 of information card 72, and cards 71, 72, and 105 are advanced to the next field.

In the event that no information is to be recorded in a particular field, the operator depresses add key 116 without striking any other key on keyboard 60 so that none of the relays in punch storage units 65, 66 are energized. Contacts 26–5 are then transferred, but contacts 76–2, 75–2 and 74–2 remain in their normal positions as shown in FIG. 17. As secondary program card 105 advances, circuits are sequentially completed through the contacts controlled by secondary star wheels 1 to 3 to energize space interposer 126. When the contacts controlled by secondary star wheel 8 are closed, a circuit is completed through contacts 26–5, terminals $$\frac{6}{8A} \quad \frac{6}{21A}$$

contacts 25–2 to 21–2, terminals $$\frac{7}{22B} \quad \frac{7}{8B}$$

to perforate column 4, row 0 in information card 72. This indicates that no digits have been dropped.

When primary star wheel 8, FIG. 14, senses the perforation in row 8, column 4, program card 71 and cam P5 closes contacts 121, a circuit is completed to energize relay coil 225LT, releasing relay 225, as described above under "Add Key Circuit." Contacts 225–2 open, breaking the circuit through relay coil 5P. Contacts 5AU then open to reset punch storage units 65 and 66.

Obviously, many modifications and variations of the present invention are possible in the light of the above teachings. For example, key storage unit 62 and floating-point counter 63 could be modified so that a smaller or greater selected number of significant digits of a number may be recorded into respective columns of a field in a card, and a smaller or greater count of the remaining digits may be recorded in a position other than the last column in the field. Again, the inventive concept may be used in systems wherein the information is recorded on and not punched in a card. It is therefore to be understood, that within the scope of the appendant claims, the invention may be practiced otherwise than as specifically described.

What is claimed is:

1. In a floating-point keypunch machine, a key storage unit comprising a plurality of key storage positions operable in a selected sequence, the key storage position operable first in said sequence being normally activated and the remaining key storage positions being normally inactivated, means responsive to a signal applied to an activated key storage position for activating an inactivated key storage position, a keyboard connected to the input of the storage position operable first in said sequence; a floating-point counter connected to the output of the key storage position operable last in said sequence; a recording unit; and means for controlling said recording unit in dependency upon the information stored in said key storage positions and floating-point counter.

2. In a floating-point keypunch machine, a key storage unit comprising a plurality of key storage positions operable in a selected sequence, the key storage position operable first in said sequence being normally activated and the remaining key storage positions being normally inactivated, means responsive to a signal applied to an activated key storage position for activating an inactivated key storage position, a keyboard connected to the input of the storage position operable first in said sequence; a floating-point counter connected to the output of the key storage position operable last in said sequence; a first and second information storage unit connected to the output of said key storage positions and said floating-point counter, respectively; a recording unit; and means for controlling said recording unit in dependency upon the information stored in said first and second storage unit.

3. In the floating-point keypunch machine set forth in claim 6 wherein said floating-point counter comprises a plurality of contact sets, each having an armature, a normal and a transferred contact, means for connecting said contact sets in series in such a manner that the transferred contact of each preceding contact set, except the last in said series, is connected to the armature of the succeeding contact set, the input of said floating-point counter including the armature of the first contact set in said series, a plurality of relay coils, each having a pick side connected to the normal contact of a respective one of said contact sets, and means responsive to the energization of each of said relay coils for establishing a holding circuit for the energized relay coil and for transferring the armature of the contact set having its normal contact connected to the energized relay coil.

4. In a floating-point keypunch machine, a key storage unit comprising a plurality of key storage positions operable in a selected sequence, each position including a plurality of relays controlling associated contacts, said contacts being connected in such a manner that selected ones, each associated with a respective relay in a key storage position, are each connected in series with a respective contact of one relay in each of the other key storage positions, a plurality of column shift relays, each positioned in a respective storage position, means responsive to the activation of the column shift relay in each key storage position for transferring the selected contacts of relays in a respective another one of said storage positions; a keyboard connected to the input of the storage position operable first in said sequence; a floating-point counter having an input connected to the output of the key storage position operable last in said sequence; and means for recording the information stored in said key storage positions and in said floating-point counter.

5. In a floating-point keypunch machine, a key storage unit comprising a plurality of key storage positions operable in a selected sequence, each position including a plurality of relays controlling associated contacts, said contacts being connected in such a manner that selected ones, each associated with a respective relay in a key storage position, are connected in series with a respective contact of one relay in each of the other key storage positions; a plurality of column shift relays, each positioned in a respective storage position, means responsive to the activation of the column shift relay in each key storage position for transferring the selected contacts of the relays in a respective another one of said storage positions; a floating-point counter having an input connected to the output of the key storage position operable last in said sequence; a first and second information storage unit connected to the output of said floating-point counter and said key storage unit, respectively; a recording unit; and means for controlling said recording unit in dependency upon the information in said first and second information storage unit.

6. The invention in claim 9 wherein said floating-point counter comprises a plurality of contact sets, each having an armature, a normal and a transferred contact, means for connecting said contact sets in series in such a manner that the transferred contact of each preceding contact set, except the last in said series, is connected to the armature of the succeeding contact set, the input of said floating-point counter including the armature of the first contact set in said series, a plurality of relay coils, each having a pick side connected to the normal contact of a respective one of said contact sets, and means responsive to the energization of each of said relay coils for establishing a holding circuit for the energized relay coil and for transferring the armature of the contact set having its normal contact connected to the energized relay coil.

7. A floating-point keypunch machine for recording information in a card comprising: means including a keyboard for generating a number comprising a first group of significant digits and a second group of remaining digits, key storage means connected to the output of said keyboard for storing the significant digits of said number, counting means connected to the output of said keyboard for counting only the remaining digits of said number, a first and second information storage unit, means for transferring information in said key storage means and said counting means to the first and second storage unit, respectively, a recording unit, and means for controlling said recording unit in dependency upon the information in said first and second storage unit.

8. In a floating-point machine for recording information, means for generating a number comprising a first group of significant digits and a second group of remaining digits, means for recording only said significant digits, means for counting only said remaining digits, and means for recording the count of said remaining digits.

9. In a floating-point keypunch machine for recording information in a card having at least one field including a plurality of columns, means for generating a number comprising a first group of significant digits and a second group of remaining digits, means for recording only the significant digits, each significant digit being recorded in a respective one of said columns of a field, means for counting only the remaining digits, and means for recording the count in another column of said field.

10. In a floating-point keypunch machine for recording information in a card, means including a keyboard for generating a number comprising a first group of significant digits and a second group of remaining digits, means connected to the output of said keyboard for storing only the significant digits, means connected to the output of said keyboard for counting only the remaining digits of said number, and means for recording the count contained in said counting means and the significant digits contained in the storing means.

References Cited in the file of this patent
UNITED STATES PATENTS

| | | |
|---|---|---|
| 2,858,888 | McGayhey et al. | Nov. 4, 1958 |
| 2,913,178 | Petherick et al. | Nov. 17, 1959 |
| 2,973,901 | Petherick et al. | Mar. 7, 1961 |